United States Patent
White

(10) Patent No.: US 6,363,963 B1
(45) Date of Patent: Apr. 2, 2002

(54) EXCESS FLOW SHUTOFF VALVE

(76) Inventor: William C. White, 3128 Riviera Way, San Ramon, CA (US) 94583

( * ) Notice: Subject to any disclaimer, the term of this patent is extended or adjusted under 35 U.S.C. 154(b) by 0 days.

(21) Appl. No.: 09/648,909

(22) Filed: Aug. 25, 2000

(51) Int. Cl.[7] ................................................. G05D 7/01
(52) U.S. Cl. ...................................... 137/498; 137/519
(58) Field of Search ................................. 137/498, 519

(56) References Cited

U.S. PATENT DOCUMENTS

| | | | | |
|---|---|---|---|---|
| 681,681 A | * | 9/1901 | Collewuie ................ | 137/519 X |
| 2,367,718 A | * | 1/1945 | Farrell ..................... | 137/519 X |
| 3,841,350 A | * | 10/1974 | Griensteidl et al. .... | 137/516.27 |
| 4,120,316 A | * | 10/1978 | Robinson, Jr. et al. ..... | 137/498 |
| 4,605,039 A | * | 8/1986 | Johnson et al. ............. | 137/460 |

* cited by examiner

Primary Examiner—Stephen M. Hepperle
(74) Attorney, Agent, or Firm—Theodore J. Bielen, Jr.

(57) ABSTRACT

An excess flow control valve which automatically shuts off when an excessive flow of liquid or gaseous material is detected. The valve uses a flow sensitive piston which is drawn up to cover the valve outlet when the flow exceeds a specified rate. When the piston is seated against the valve outlet, flow ceases, or is reduced dramatically, and the piston is held in place by the pressure of the supply. Additionally, ports are provided to activate a pressure differential device which can be used for remote monitoring and/or valve position, i.e., a red flag or switch, if desired.

4 Claims, 1 Drawing Sheet

EXCESS FLOW SHUTOFF VALVE

BACKGROUND OF THE INVENTION

1. Field of Invention

This invention is in the general field of liquid or gaseous material flow regulating systems, and more specifically, concerns a valve that automatically shuts off when flow rates exceed a specified limit.

2. Description of Prior Art

In many applications, it would be desirable to stop the flow of a liquid or gaseous material through various types of conduit if the device that normally controls the flow should become damaged or otherwise inoperable; eliminating the potential for personal injury, property damage, flooding, etc.

Expedience in detecting and automatically shutting off unregulated flow of liquid and/or gaseous material can prevent undesirable, and potentially hazardous, conditions.

There are currently numerous U.S. Patents granted for valves that limit excess or undesirable flow of either liquid or gaseous materials. However, it is believed that this new design offers more flexibility, ease of construction, and desirable operating characteristics than the alternatives currently available.

U.S. Pat. No. 4,174,731 shows an excess flow limiting valve which utilizes a spring to control the movement of a plug assembly.

U.S. Pat. No. 4,825,897 describes a fluid control device in which a weighted spherical ball is positioned in the housing which seats during adnominal fluid conditions in the housing.

U.S. Pat. No. 4,842,198 describes a spring loaded valve which interrupts sprinkler flow when abnormal flow is detected.

U.S. Pat. No. 4,867,603 shows a spring loaded shutoff valve which protects against flooding by broken sprinklers and risers in farming applications.

U.S. Pat. No. 5,613,518 shows a spring loaded valve which restricts excess flow through a conduit.

U.S. Pat. No. 5,857,487 shows a shutoff valve which moves along a guide when excess flow occurs in a sprinkler outlet pipe. The valve described operates with conduits that intersect at rights angles.

U.S. Pat. No. 6,003,550 describes a spring loaded valve which provides positive shutoff and excessive flow shutoff.

U.S. Pat. No. 6,019,115 shows a valve system which controls excess flow that has flow rate settings. The valve is spring operated.

U.S. Pat. No. 5,472,008 teaches a valve for gaseous fluids which protects against dangerous variations in temperatures and flow due to thermal stress.

U.S. Pat. No. 5,465,751 describes an excess flow control valve which has a spring loaded plug that seats upon the detection of unusual pressure.

U.S. Pat. No. 5,462,081 shows a poppet flow valve controller which is spring loaded and includes a poppet element having two sections.

U.S. Pat. No. 5,280,806 teaches an excess flow valve which possesses a magnetically attractable closure element that operates at a particular flow rate of fluid.

U.S. Pat. No. 5,203,365 describes a magnetically operated excess flow check valve in compact form.

U.S. Pat. 4,830,046 shows an excess flow control valve with an internal ball valve biased by a coil spring.

U.S. Pat. No. 4,809,740 illustrates an excess flow limiter in which a slide member is spring loaded and is operated by a button mounted to the outlet chamber.

U.S. Pat. No. 4,574,833 describes an excess flow control device having a reciprocating ferromagnetic armature.

U.S. Pat. No. 4,132,237 shows an excess flow shutoff valve for hazardous fluids which is spring loaded and may also function to stop the action of a pump.

U.S. Pat. No. 4,093,001 shows an excess flow valve for use in a conduit which is provided with a valve disk which may be manually or automatically operated.

The closest known art, U.S. Pat. No. 5,857,487, claims use for only water and the pipes must intersect at right angles. U.S. Pat. No. 4,825,897 claims only use for fluids and states that changes are required for different water pressures.

Valves using a spring device maybe sensitive to aging and pressure variations. Unlike the other prior art valves, the valve of the present application is not affected by variable pressure and has no known aging affects. No other known valve discloses a flow-sensitive piston control closure of the valve.

SUMMARY OF THE INVENTION

An object of this invention is to provide an improved excess flow valve which automatically prevents the free flow of liquid or gaseous materials in the event flow rates exceed a specified limit, and which can be used in most conduit systems.

Another objective of this invention is to allow the monitoring of the valve system through ports which can activate remote signaling devices, i.e., red flags, switches, etc., in the event of valve activation.

These and other objects of this invention are achieved by utilizing a flow sensitive piston with a diameter larger than the outlet port's bore. In the event flow rates exceed a specified limit, sufficient low pressure is generated over the piston's top surface, drawing the piston against the outlet port's bore; where its position is maintained by the supply pressure, thus blocking the flow.

The invention consists of certain novel features and details hereinafter fully described, and illustrated in the accompanying drawings, it being understood that various changes in details may be made without departing from the spirit or functions of the present invention.

DESCRIPTION OF THE DRAWINGS

For the purpose of facilitating and understanding the invention, there is illustrated in the accompanying drawings a preferred embodiment thereof, from an inspection of which, when considered in connection with the following description, the invention, its construction and operation, and many of its advantages will be readily understood and appreciated.

DESCRIPTION OF THE PREFERRED EMBODIMENT

Figure 1:
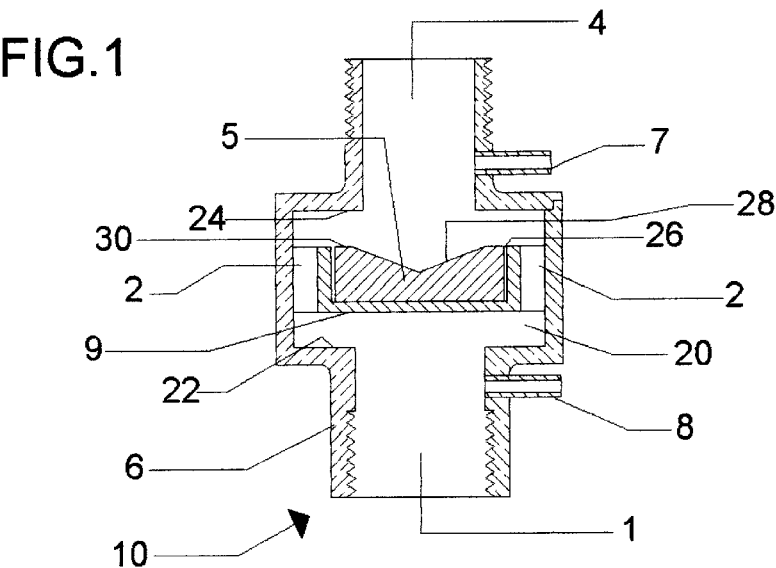
FIG. 1 is a vertical cross-sectional view showing the valve of the present application in its open position.

Referring to the drawings, FIG. 1 discloses valve 10 of the present invention. Valve 10 is an excess shutoff valve which reacts to excess flow through a conduit (not shown). Valve 10, disclosed in its open position in FIG. 1, includes a valve body 6 having an inlet port 1 and an outlet port 4. Valve body 6 defines an interior chamber 20 having an interior wall 22. Interior chamber 20 communicates with inlet port 1 and outlet port 4 when valve 10 is in its open position as depicted in FIG. 1. Outlet port 4 further includes a seat 24, whose function will be described hereinafter. Indicator ports 7 and 8 pass to remote signaling devices (not shown) to indicate activation of valve 10.

A plate 9 is fixed within chamber 20 of valve 10 and includes a bore 26 to hold piston 5. Passage 2 separate plate 9 from interior wall 22 of valve body 6. Fluid entering-valve 10 passes through inlet port 1, passages 2, and exits through outlet port 4 in the normal operation, shown in FIG. 1.

Figure 2:
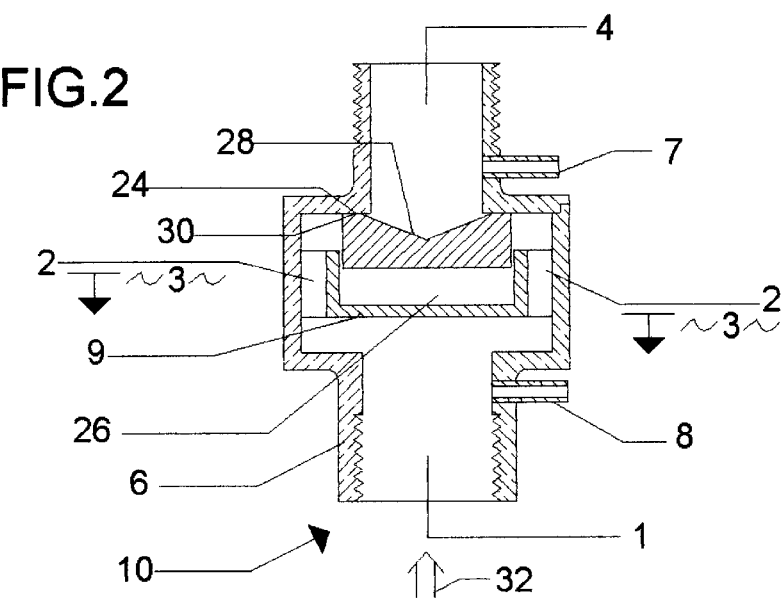
FIG. 2 is a vertical cross-sectional view showing the valve of the present application in its closed position.
Figure 3:
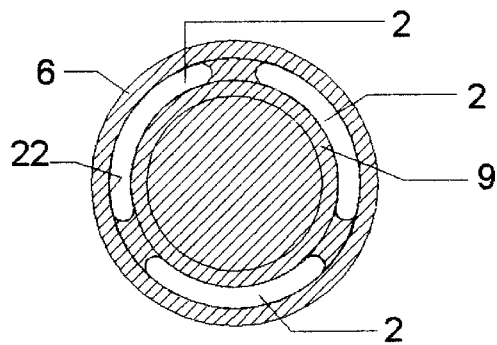
FIG. 3 is a sectional view taken along line 3—3 of FIG. 2.

Piston 5 normally lies within bore 26 of piston plate 9. Piston 5 is provided with a depressed, vee-shaped upper surface 28 which renders piston 5 as flow-sensitive. Seating surface 30 of piston 5 is capable of contacting seat 24 of outlet port 4. Surface 28 of piston 5 interacts with fluid flowing through valve 10, including passages 2. With reference to FIG. 2, it may be observed that when excess fluid is passing through valve 10, directional arrow 32. the depressed vee-shaped surface 28 of piston 5 causes piston 5 to rise from bore 26 such that seating surface 30 seals against seat 24 of outlet port 4.

In operation, fluid enters valve 10 through inlet port 1 which pressurizes inlet indicator port 8. The fluid flow continues through passages 2 in piston plate 9 and through outlet port 4. Outlet indicator port 7 is pressurized at this time also. When the fluid flow through inlet port 1 is excessive, directional arrow 32, piston 5 moves from bore 26 into its seating position where seating surface 24 seals against seat 28 of outlet port 4. Piston 5 then blocks the flow of fluid to outlet port 4 and outlet indicator port 7. Piston 5 will stay in this position until the inlet pressure of the fluid passing into inlet port 1 is interrupted. The differential in pressure between outlet indicator port 7 and inlet indicator port 8 may be used to trigger an alarm.

While in the foregoing embodiments of the invention have been set forth in considerable detail for the purposes of making a complete disclosure of the invention, it may be apparent to those of skill in the art that numerous changes may be made in such details without departing from the spirit and principles of the invention.

What is claimed is:

1. A excess flow control valve to stop the flow of fluid in a conduit, comprising:

a. a valve body, said valve body including an inlet port and an outlet port, said inlet port and said outlet ports communicating with an interior chamber of said valve body, said outlet port further including a seat;

b. a plate located at said interior chamber of said valve body between said inlet and outlet ports thereof said plate including bore, and a passage therethrough to permit fluid to pass from said inlet port to said outlet port; and c. a movable piston fitting within said bore of said valve body, said piston including a depressed surface and a seating surface, said depressed surface contacting fluid flowing through said passage of said plate, said movable piston seating surface contacting said seat of said outlet port upon a predetermined flow of fluid through said passage of said plate.

2. The valve of claim 1 in which said depressed surface is vee-shaped in section.

3. The valve claim 1 which additionally includes a device for indicating the position of said piston within said valve body.

4. The valve of claim 3 in which said device includes a first indicator port and a second indicator port, said first indicator port communicating with said outlet port of said valve body, said second indicator port communicating with said inlet port of said valve body.

\* \* \* \* \*